Sept. 10, 1935.  J. G. KNIGHT  2,013,965
ELECTRIC BUSHING, FIXTURE STUD, ETC
Filed June 6, 1931
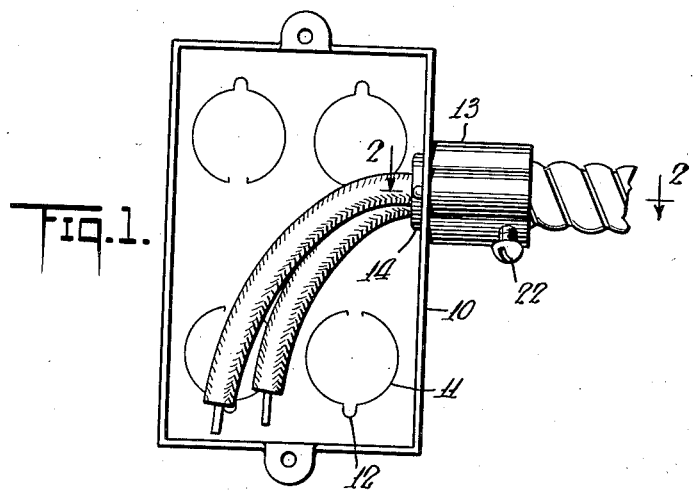
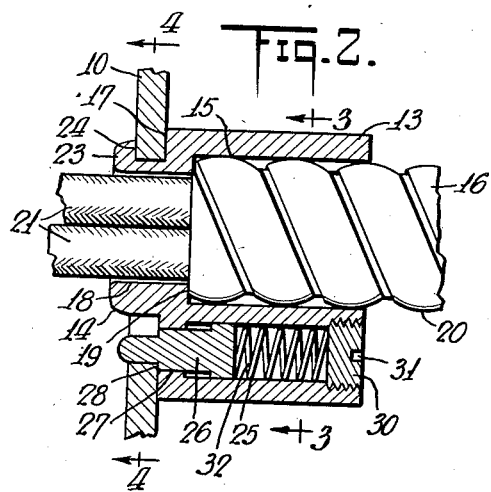
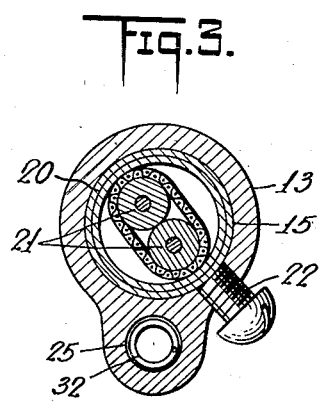
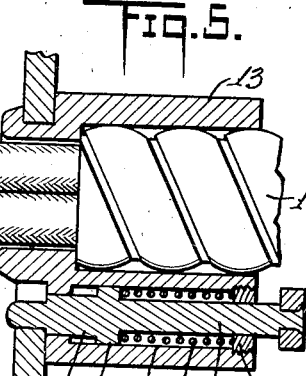
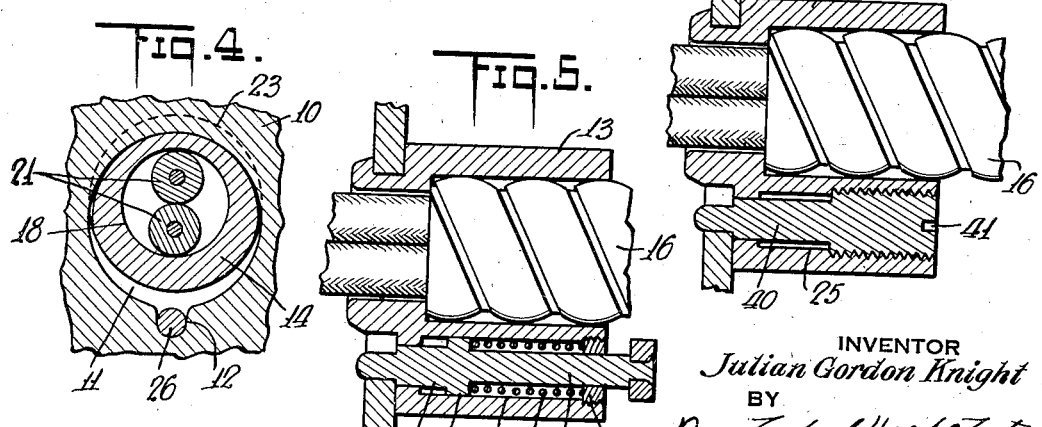
INVENTOR
Julian Gordon Knight
BY
Dean Fairbank Hirsch Foster
ATTORNEYS Patented Sept. 10, 1935

2,013,965

UNITED STATES PATENT OFFICE 2,013,965

ELECTRIC BUSHING, FIXTURE STUD, ETC.

Julian Gordon Knight, Brooklyn, N. Y.

Application June 6, 1931, Serial No. 542,508

6 Claims. (Cl. 247—25)

This invention relates to a type of device adapted to be attached to the wall of a housing forming part of an electrical installation, and in different embodiments may be constructed to serve as a bushing for connecting a conduit or an electrical cable to an outlet box or other housing, as a lining bushing through which a flexible conductor may extend, as a fixture stud, and the like.

My improved device is of the type in which there is provided a body portion having a transverse notch or groove adapted to receive the edge of the wall of the housing, and a locking member movable in a direction substantially at right angles to the wall, and cooperating with said body portion to lock the body portion against endwise, lateral, rotary or other movement in respect to the wall.

One object of the present invention is to simplify the construction and operation of a device, and to simplify the means whereby said device may be secured to the wall of a housing.

Another object of the present invention is to provide a device adapted to be attached to the wall of a housing, and having a minimum portion thereof project from the inner surface of the housing to which said device is connected.

Still another object of the present invention is to provide a device adapted to be attached to the wall of a housing, and constructed in such a manner that the device may be very expeditiously locked in position on such wall, by a simple hand manipulation without the necessity of the use of tools.

In the accompanying drawing, there are shown for the purpose of illustration, various forms of the device embodying the present invention. In this drawing Fig. 1 shows an outlet box with one form of my improved bushing adapted for the securing of a flexible electric cable thereto.

Fig. 2 is a section taken on line 2—2 of Fig. 1, and on a larger scale.

Figs. 3 and 4 are sections taken on lines 3—3 and 4—4 respectively, of Fig. 2.

Fig. 5 is a section similar to Fig. 2, but showing another form of bushing, and

Fig. 6 is a section similar to Fig. 2, but showing another form of bushing.

The invention is shown in the form of a bushing for securing a flexible electric cable, conduit or other conductor casing to the wall of a housing. This housing is shown as a common form of electric outlet box 10 having a plurality of knockout openings 11, any one of which is adapted to receive the bushing. These knockout openings 11 are of the usual construction, except that they are provided with notches 12 on the periphery thereof. The bushing 13 has an end portion 14 adapted to be projected in the knockout opening, and a bore 15 for the reception of an electrical cable 16.

In my improved construction, the end portion or head 14 is smaller than the main body of the bushing, so as to provide an axially facing shoulder 17 on the outside, and has a reduced bore 18 at the end of the passage, which latter terminates at a shoulder 19 facing axially in the opposite direction. The shoulder 19 serves as an abutment for one end of the sheathing 20 of the electrical cable 16. The reduced bore 18 extends through the head or end portion, and is adapted to receive the insulated wires 21 of the cable. The end of said bore 18 is rounded to provide a non-abrading surface with which the insulated wires may contact without injury thereto. Because of the fact that the sheathing terminates against the shoulder 19, and the wires bend about the rounded end of the bore, said wires are protected from being cut or abraded on the end of the sheathing of the cable. The cable 16 may be held in position in the bushing in any suitable manner, as for instance, by a suitable set screw 22 passing through the walls of the bushing 13 and impinging on the sheathing 20.

In order to provide means for preventing the axial movement of the bushing when disposed in position, the head 14 of the bushing 13 is smaller than the knockout openings, so that it may move laterally therein, and has extending from one side a lug 23 which is spaced from the shoulder 17 to provide a groove 24 for receiving the edge of the wall of the outlet box 10. Such a lug is advantageously produced by forming a crescentic groove on the periphery of the head 14 of the bushing.

The head including the lug is slightly smaller than the opening 11, so that said head may be slipped axially through said opening until the shoulder 17 abuts one side of the wall of the housing 10. The bushing 13 may then be moved in a transverse direction, until the groove 24 engages the edge of the walls, thereby locking said bushing against axial movement.

In order to provide means for locking said bushing to said wall, and against rotative or lateral movement, said bushing has connected thereto along one side thereof guide means for a slidable locking member. This guide means advantageously comprises a chamber 25 extending lengthwise of the bushing at one side thereof, and in which is slidably mounted a movable locking member in the form of a pin 26. This pin is advantageously disposed diametrically opposite to the groove 24, and is slidable in a direction substantially parallel to the axis of the bushing 13. One end of the wall of the chamber 25 is provided with an opening 27 smaller than the bore of the chamber 25, for receiving a terminal portion of the pin of correspondingly reduced diameter. The end of the chamber forms a flange on the side of the bushing, and has its end surface flush with the shoulder 17. The pin may have a shoulder 28 of a width slightly greater than the width of the notch 12, so as to abut the surfaces of the wall of the outlet box at the sides of said notch. This notch 12 is disposed in the path of travel generated by said pin 26 when said bushing 13 is rotated with the groove 24 engaging the edge of the wall, as shown in Fig. 4. Under these conditions, the pin 26 may be moved into axial aligned position with the notch 12.

In order to provide means whereby the pin 26 can be automatically slipped into the notch 12 when in this position, one end of the guide chamber 25 is provided with a shoulder serving as an abutment for a compression spring 32 acting on the pin 26. As shown, the shoulder is formed by a plug 30 which is threaded to said chamber, and which is provided with a slot 31 to receive a turning tool. Under the action of this spring, the pin 26, upon being disposed in aligned position with said notch 12, will automatically slip therein. The end of said pin 26 is preferably rounded to facilitate its axial entry into the notch 12. The shoulder 28 on the pin, when it has reached the wall of the housing, serves to limit the further endwise movement of said pin. As the result of this construction, the device may be locked to the wall member by a very simple manipulation without the necessity of using tools.

In order to detach the bushing from the wall member, I may push the pin back against the action of the spring by using a small nail, matchstick, or the like, until the head has cleared the notch 12. While holding this pin back, the bushing may be moved transversely and then axially.

In some installations, it is desirable to provide a means whereby the pin 26 may be withdrawn without having access to the interior of the outlet box or other walled casing. In Fig. 5 is shown a form of invention whereby such manipulation may be effected. For that purpose, there is slidably mounted in the guide chamber 25, a pin 33 having an enlarged portion 34 for engaging the wall of said chamber, and a reduced portion 35 encircled by the spring 38. The reduced portion may extend befond the outer end of the bushing and past a shoulder 36 forming an abutment for the spring. The projecting end of the bolt 33 may be easily grasped to pull the pin back against the action of the spring.

In Fig. 6 is shown another form of construction which permits the easy detachment of the bushing from the wall, and includes a bolt 40, one end of which has a threaded engagement with a threaded portion of the chamber 25. This bolt is provided with a slot 41 at one end for receiving a suitable turning tool. This construction provides a positive means for locking the bushing 13 to the wall, and prevents any possibility of the bolt 40 being withdrawn accidentally.

Having thus described my invention, what I claim as new and desire to secure by Letters Patent is:—

1. A device of the class described adapted to be secured in an opening in the wall of a housing forming part of an electrical installation, and including a member having a head portion which is shiftable in said opening, means disposed on one side of said member for engaging the edge of the opening to prevent axial movement of said member when mounted in position with respect to said wall, a guide chamber on one side of said member, a pin slidable endwise within said chamber, and a spring acting on said pin for yieldingly forcing it beyond said chamber into engagement with said wall, said pin being adapted to lock said member to said wall against relative rotational movement.

2. In combination, an electric housing wall having an opening with a notch on one side thereof, a bushing having a head portion having a maximum diameter less than the diameter of said opening, and extending therethrough, said head portion being reduced to form a shoulder on said bushing abutting one side of said wall, said head portion having the periphery thereof grooved to engage the edge of the opening, a pin extending lengthwise of said member along one side thereof, and spring means acting on said pin for urging said pin towards the head end of said member and for yieldingly projecting the end of said pin beyond said shoulder and into said notch.

3. An electric fitting having a tubular body portion, a head at one end thereof and of a maximum diameter smaller than said body portion, and having a transverse groove in one side thereof, a bolt extending lengthwise of said tubular member along one side therof, and spring means acting on said bolt for urging said bolt towards said head and for yieldingly projecting the head end of said bolt beyond the end of said body portion to a position alongside of said head.

4. A device of the class described adapted to be secured in an opening in the wall of a housing forming part of an electrical installation, and including a member having a head portion, means disposed on one side of said member for engaging the edge of the opening to prevent axial movement of said member with respect to said wall, a pin carried by said member for locking said member to said wall against rotative movement, and extending lengthwise of said member along one side thereof, and spring means acting on said pin for urging said pin towards the head end of said member into engagement with said wall.

5. A device of the class described adapted to be secured in an opening in the wall of a housing, and including a member having an axially facing shoulder, a head portion beyond said shoulder, a lug on said head portion and axially spaced from said shoulder, a guide chamber extending lengthwise of said member along one side thereof and having end walls, a pin mounted in said chamber for endwise slidable movement therein, said pin having both ends thereof projectable through said end walls, and spring means in said chamber for urging said pin towards the head end of said member and for yieldingly projecting the head end of said pin beyond the head end of said chamber and into engagement with said housing wall.

6. In combination an electric outlet box having an opening in the wall thereof, said opening having a preformed notch at one edge thereof, a tubular coupling member adapted to receive an electric conduit or cable and having a head portion of a maximum diameter smaller than said opening and projecting therethrough, said head portion having a groove on one side thereof for engaging the edge of the opening opposite to said notch upon the lateral movement of the head portion in said opening, a flange extending lengthwise of said coupling member opposite to said groove and having the end surface nearest to the head portion abutting said outlet box wall, and a locking bolt carried within said flange and fixed against lateral movement with respect to said coupling member for locking said coupling member against relative movement in respect to said outlet box wall, said bolt having an inner end portion presenting a substantially cylindrical smooth outer surface retractable beyond the end surface of said flange to permit direct abutment of said coupling member with said wall and said lateral movement of said coupling member, and said end portion being movable in an endwise direction beyond said end surface and into said notch, to hold the said coupling member in a predetermined position and prevent rotation of said coupling member.

JULIAN GORDON KNIGHT.